US010286525B2

(12) United States Patent
Finck et al.

(10) Patent No.: US 10,286,525 B2
(45) Date of Patent: May 14, 2019

(54) WINDSCREEN INSTALLATION APPARATUS AND METHOD

(75) Inventors: William Finck, Essex (GB); Christopher Davies, Kidwelly (GB)

(73) Assignee: Belron International Limited, Egham (GB)

(*) Notice: Subject to any disclaimer, the term of this patent is extended or adjusted under 35 U.S.C. 154(b) by 141 days.

(21) Appl. No.: 13/882,810

(22) PCT Filed: Nov. 2, 2011

(86) PCT No.: PCT/GB2011/052130
§ 371 (c)(1),
(2), (4) Date: May 28, 2013

(87) PCT Pub. No.: WO2012/059755
PCT Pub. Date: May 10, 2012

(65) Prior Publication Data
US 2013/0232766 A1    Sep. 12, 2013

(30) Foreign Application Priority Data

Nov. 3, 2010 (GB) .................................. 1018558.5
Dec. 15, 2010 (GB) .................................. 1021286.8
Feb. 14, 2011 (GB) .................................. 1102518.6

(51) Int. Cl.
*B60J 1/00* (2006.01)
*B25B 11/00* (2006.01)
*B62D 65/06* (2006.01)

(52) U.S. Cl.
CPC ............. *B25B 11/007* (2013.01); *B60J 1/005* (2013.01); *B62D 65/06* (2013.01);
(Continued)

(58) Field of Classification Search
CPC ...... B25B 11/005; B25B 11/007; B60J 1/004; B60J 1/005; B60J 1/006; Y10T 29/53961; Y10T 29/49998; Y10T 29/49902; Y10T 29/49622; Y10T 29/49895; Y10T 29/53974; Y10T 29/538; Y10T 29/53983; Y10T 29/49876
See application file for complete search history.

(56) References Cited

U.S. PATENT DOCUMENTS 3,620,524 A    11/1971    Czompi
3,701,507 A    10/1972    Bell
(Continued)

FOREIGN PATENT DOCUMENTS

DE            8713352         11/1988
DE    202004013157 U1    1/2006
(Continued)

*Primary Examiner* — Sarang Afzali
*Assistant Examiner* — Darrell C Ford
(74) *Attorney, Agent, or Firm* — Gordon & Jacobson, P.C.

(57) ABSTRACT

Apparatus for use in handling windscreens for example for installation in a vehicle, includes a windscreen anchor assembly comprising a windscreen anchor device and a support arm extending away from the windscreen anchor device. A mount assembly is provided for supporting the windscreen anchor assembly. The mount assembly includes a mount structure for engaging with the support arm such that the support arm can slide bodily in its longitudinal direction with respect to the mount structure.

23 Claims, 12 Drawing Sheets

(52) U.S. Cl.
CPC .... *Y10T 29/49826* (2015.01); *Y10T 29/53974* (2015.01); *Y10T 29/53978* (2015.01); *Y10T 29/53991* (2015.01)

(56) References Cited

U.S. PATENT DOCUMENTS

| | | | |
|---|---|---|---|
| 4,183,511 A * | 1/1980 | Marek | B66F 3/08 |
| | | | 254/100 |
| 4,249,712 A | 2/1981 | Delong | |
| 4,523,786 A | 6/1985 | Letournoux et al. | |
| 4,592,526 A | 6/1986 | Kobelt | |
| 4,998,711 A * | 3/1991 | Borg | B25B 11/00 |
| | | | 269/21 |
| 5,039,050 A * | 8/1991 | Eidschun | B60R 11/04 |
| | | | 248/279.1 |
| 5,102,089 A | 4/1992 | Baur | |
| 5,398,602 A | 3/1995 | Taylor | |
| 5,531,416 A * | 7/1996 | Remmers | 248/222.51 |
| 5,707,450 A * | 1/1998 | Thompson | B05B 13/0285 |
| | | | 118/500 |
| 5,897,882 A * | 4/1999 | Gonzalez | B29C 73/025 |
| | | | 156/382 |
| 5,953,802 A | 9/1999 | Radzio | |
| 5,964,443 A | 10/1999 | Leveille | |
| 6,101,702 A * | 8/2000 | Claycomb | B25B 11/007 |
| | | | 254/95 |
| 6,543,117 B1 * | 4/2003 | Claycomb | B25B 11/007 |
| | | | 29/239 |
| 7,022,553 B2 | 4/2006 | Ahn et al. | |
| 7,039,995 B2 * | 5/2006 | Thompson | 29/281.5 |
| 7,216,411 B1 * | 5/2007 | Mayhugh | 29/468 |
| 7,322,092 B2 * | 1/2008 | Adas et al. | 29/468 |
| 7,461,826 B2 | 12/2008 | Carnevali | |
| 7,610,666 B2 | 11/2009 | Ades et al. | |
| 8,393,064 B2 * | 3/2013 | Adas et al. | 29/281.4 |
| 8,413,307 B2 * | 4/2013 | Katzenberger | B21J 15/10 |
| | | | 29/240 |
| 8,672,309 B2 * | 3/2014 | Birkhauser et al. | 269/22 |
| 8,677,626 B2 * | 3/2014 | Adas et al. | 29/897.2 |
| 9,302,356 B2 * | 4/2016 | Katzenberger | B21J 15/10 |
| 9,643,475 B2 | 5/2017 | Finck et al. | |
| 2004/0003488 A1 * | 1/2004 | Thompson | 29/281.1 |
| 2006/0156533 A1 * | 7/2006 | Mayhugh | 29/468 |
| 2007/0062020 A1 | 3/2007 | Mayhugh | |
| 2007/0108790 A1 * | 5/2007 | Adas et al. | 296/97.9 |
| 2008/0122245 A1 * | 5/2008 | Adas et al. | 296/97.9 |
| 2009/0145356 A1 | 6/2009 | Lai | |
| 2009/0300847 A1 | 12/2009 | Chan | |
| 2011/0089619 A1 * | 4/2011 | Birkhauser et al. | 269/22 |
| 2015/0360737 A1 * | 12/2015 | Brummett | B60J 1/004 |
| | | | 156/331.8 |
| 2018/0355628 A1 * | 12/2018 | Lin | E04G 23/002 |

FOREIGN PATENT DOCUMENTS

| | | | |
|---|---|---|---|
| DE | 202007016885 | 5/2009 | |
| EP | 2316678 A1 | 5/2001 | |
| EP | 1785300 A2 | 5/2007 | |
| EP | 1826044 | 8/2007 | |
| EP | 1849634 | 10/2007 | |
| EP | 1923243 | 5/2008 | |
| FR | 2758786 A1 | 7/1998 | |
| FR | 2828826 | 2/2003 | |
| FR | 2828875 | 2/2003 | |
| GB | 2273517 A | 6/1994 | |
| GB | 2359113 | 8/2001 | |
| GB | 2486506 A * | 6/2012 | B60J 1/00 |
| WO | WO99/42244 A1 | 8/1999 | |
| WO | WO 2009131576 A1 * | 10/2009 | B62D 65/06 |
| WO | WO 2012059755 A1 * | 5/2012 | B60J 1/00 |

* cited by examiner

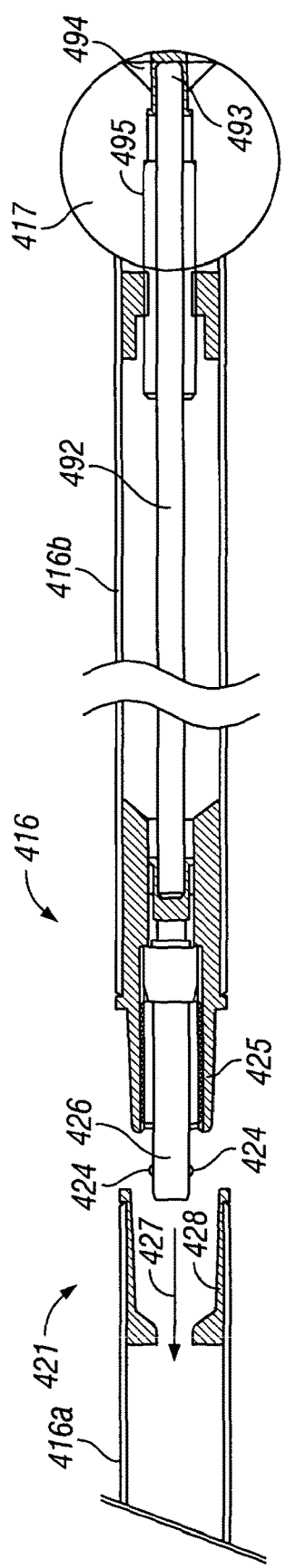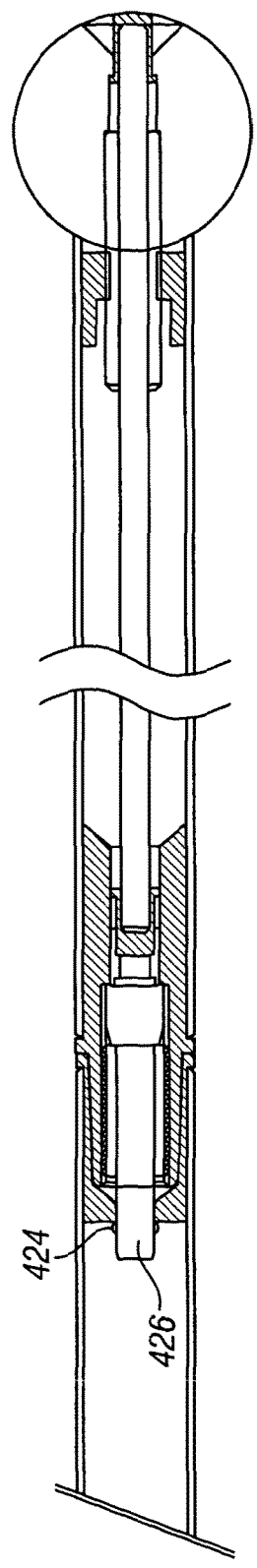
FIG. 15
FIG. 16

WINDSCREEN INSTALLATION APPARATUS AND METHOD

CROSS-REFERENCE TO RELATED APPLICATIONS

This application claims priority from PCT/GB/2011/052130 filed on Nov. 2, 2011, from GB 1018558.5, filed Nov. 3, 2010, from GB 1021286.8, filed Dec. 15, 2010 and from GB 1102518.6, filed Feb. 14, 2011, all of which are hereby incorporated by reference in their entireties.

BACKGROUND

1. Field

The present invention relates to a windscreen installation apparatus and method.

2. State of the Art

Various apparatus enabling a single technician to handle a windshield, for example for positioning in the windscreen aperture or open frame of a vehicle is known and disclosed in EP 1826044, EP 1923243, US7610666 and DE 202007016885. Such apparatus is particularly suited for use in situations of mobile use, where for example a single technician typically visits a vehicle that has a windscreen that needs replacement. In such situations an apparatus that is convenient to transport and assemble and also easily used by a lone technician has a significant benefit. However the apparatus of the present invention is also suitable for use in a workshop or depot.

In both arrangements disclosed in EP 1826044, EP 1923243 and US7610666 a side window glass anchor is used to mount a pivot structure to a side window glass of the vehicle. A windscreen securing structure has an arm which is arranged to engage at one end with the pivot pin of the pivot structure on the side window glass anchor, and also to carry an anchor for securing to the windshield. The windscreen can be manipulated for positioning by the technician supported at one side by the technician and at the other by the arm mounted on the pivot pin of the side glass anchor. The anchors are typically pump actuated sucker devices as known in the art. In the arrangement of EP 1826044 and EP 1923243, the arm of the windscreen securing structure is telescopic to enable extension. In the arrangement of U.S. Pat. No. 7,610,666 the windscreen anchors are slidable along a rod comprising the arm.

The prior art arrangements suffer drawbacks in terms of complexity of construction, weight and also potential for damage during their use life. An improved arrangement has now been devised.

SUMMARY

According to a first aspect, the present invention provides apparatus for use in handling windscreens for example for installation in a vehicle, the apparatus comprising:
   a windscreen anchor assembly comprising a windscreen anchor device and an elongate support arm extending away from the windscreen anchor device;
   a mount assembly for supporting the windscreen anchor assembly, wherein the mount assembly includes a mount structure for engaging with the support arm such that the support arm can move (preferably slide) in its longitudinal direction with respect to the mount structure.

The entire support arm is designed to move bodily, in its entirety, with respect to the mount structure and in the longitudinal direction of the support arm.

Therefore, according to an alternative aspect, the invention provides apparatus for use in handling windscreens for example for installation in a vehicle, the apparatus comprising:
   a windscreen anchor assembly comprising a windscreen anchor device and an elongate support arm extending away from the windscreen anchor device;
   a mount assembly for supporting the windscreen anchor assembly, wherein the mount assembly includes a mount structure for engaging with the support arm such that the support arm can move bodily, in its entirety, with respect to the mount structure and in the longitudinal direction of the support arm.

It is preferred that the engagement between the mount structure and the support arm is sliding engagement, preferably such that the support arm slides longitudinally past or through the mount structure.

Preferably, the engagement between the mount structure and the support arm is such that the arm may be lowered into an engagement position with the mount structure, and also preferably raised or lifted out of an engagement position with the mount structure. The mount structure preferably has an upper opening through which the support arm may enter into the structure to be seated for sliding engagement.

The arrangement is beneficially such that the mount structure acts as a guide for guiding the sliding movement of the support arm.

In a preferred embodiment, the mount structure may comprise a yoke or saddle structure having opposed upstanding sides or side elements for guiding and retaining the opposed sides of the support arm of the windscreen anchor assembly.

In a preferred embodiment, the mount structure permits the elongate arm of the windscreen anchor assembly to be rotated or pivoted about the location of connection to the mount structure. Beneficially, the mount structure is rotatably mounted in order to achieve this result.

It is preferred that the elongate support arm of the windscreen anchor assembly is of circular cross section in the region of interaction with the mount structure. This enables the support arm to be easily rotated about its longitudinal axis when engaged with the mount structure, in addition to being slidable in the direction of its length.

In a preferred embodiment, the elongate support arm of the windscreen anchor assembly is an elongate rod. The support arm preferably engages with the mount structure at a point along the length of the support arm spaced from the opposed ends of the arm.

The elongate support arm of the windscreen anchor assembly is preferably provided with a stop inhibiting an end of the arm from sliding past the mount structure. The stop may engage with the mount structure at one extreme limit of sliding movement. In one embodiment the stop may be a spherical stop device.

In a preferred the windscreen anchor device is mounted in a fixed position on the elongate support arm.

In a certain embodiment, the elongate support arm of the windscreen anchor assembly may be in two or more part form arranged to engage end to end.

In a preferred arrangement, the mount assembly includes a vehicle anchor device enabling securing of the mount assembly to the vehicle. In a preferred arrangement, the mount assembly may include a side glass anchor device enabling securing of the mount assembly to the vehicle side glass.

Typically, the side glass anchor device may comprise a suction device, as may the windscreen anchor device. Pump actuation suction devices may be used, as known in the art.

In one embodiment, the mount assembly may include an arm portion connected at one end to carry the mount structure and at a second end to a rotatable mount comprising the mount assembly.

According to a further aspect, the present invention provides mount assembly for use in handling windscreens, for example for installation in a vehicle, the mount assembly comprising a vehicle anchor device for securing to the vehicle and an elongate arm extending from the anchor device, wherein the elongate arm is rotatably mounted with respect to the anchor device enabling the arm to be moved between alternative mounting configurations.

It is preferred that means is provided for securing the arm in the alternative mounting configurations. A brake handle, securing bolts or other mechanical means may be used for this purpose.

Beneficially, in the alternative mounting configurations the arm extends in opposed directions from the anchor device.

It is preferred that the arm is pivotable or rotatable about a substantially upright rotational axis.

In a preferred realisation of the invention, the vehicle anchor device comprises a side glass anchor device enabling securing of the mount assembly to the vehicle side glass. Beneficially, the vehicle anchor device comprises a suction device.

Preferably, the mount is intended for use in combination with a windscreen anchor assembly comprising a windscreen anchor device and an elongate support arm extending away from the windscreen anchor device; wherein the mount assembly includes a mount structure for engaging with the support arm such that the support arm can slide in its longitudinal direction with respect to the mount structure.

It is preferred that mount structure is supported with respect to the anchor device on a rotatable or pivotable mounting to enable the mount structure to be moved between a dropped down and a raised up position.

According to a further aspect, the present invention provides a mount assembly for use in handling windscreens, for example for installation in a vehicle, the mount assembly comprising a vehicle anchor device for securing to the vehicle and a mount structure for engaging with a support arm of windscreen anchor assembly, wherein the mount structure is supported with respect to the anchor device on a rotatable or pivotable raising and lowering mounting to enable the mount structure to be moved between a dropped down and a raised up position.

It is preferred that the axis of rotation of the raising and lowering mounting is substantially horizontal.

Preferably, an elongate arm extends from the anchor device and the axis of rotation of the mounting is substantially aligned with or parallel to the longitudinal direction of the arm.

Beneficially, an elongate arm extends away from the raising and lowering mounting to the mount structure which is spaced from the raising and lowering mounting.

It is preferred that the raising and lowering mounting is rotatable in an index-wise between a series of successively rotationally spaced positions.

The arrangement preferably includes securing means for securing the raising and lowering mounting in the desired position.

In a preferred embodiment, the raising and lowering mounting may be provided in series with a side to side rotational mounting enabling the mount structure to be moved from side to side.

According to an alternative aspect, the invention provides apparatus for use in handling windscreens for example for installation in a vehicle, the apparatus comprising a windscreen anchor assembly comprising a windscreen anchor device and an elongate support arm extending away from the windscreen anchor device, the elongate arm being dismantle-able into more than one piece for stowage, the anchor device and a dismantled arm part being provided with means for attaching to one another for stowage.

It is preferred that, in the stowed configuration, the dismantled arm part attached to the windscreen anchor device and a remaining fixed arm part, are of approximately the same length.

It is preferred that, in the stowed configuration the dismantled arm part attached to the windscreen anchor device and a remaining fixed arm part, are arranged in substantially side by side relationship.

Beneficially, the two arm parts are provided with complementary end connections to enable connection together, and the end connection of the dismantle-able arm part is used to connect with a complementary connection provided on the anchor device.

According to an alternative aspect, the invention provides a method of installing a windscreen in a vehicle the method comprising:

setting in position a windscreen anchor assembly comprising a windscreen anchor device secured to the windscreen and an elongate support arm extending away from the windscreen anchor device;

setting in position a mount assembly for supporting the windscreen anchor assembly, wherein the mount assembly includes a mount structure for engaging with the support arm;

engaging the support arm with the mount structure at a point along the length of the support arm spaced from the opposed ends of the arm such that the support arm can slide in its longitudinal direction with respect to the mount structure in order to position the windscreen in the vehicle windscreen opening.

Specific embodiments of the invention will now be further described, by way of example only, with reference to the accompanying drawings.

BRIEF DESCRIPTION OF THE DRAWINGS

FIGS. 10a to 10c are views of an alternative embodiment of windscreen anchor device for apparatus in accordance with the invention (showing the two-piece support rod arrangement in a stowed configuration);

FIGS. 11a to 11c are views of an alternative embodiment of windscreen anchor device for apparatus in accordance with the invention (showing the two-piece support rod arrangement in a stowed configuration);

FIGS. 15 and 16 are schematic views of an alternative embodiment of windscreen anchor device for implementation of the invention.

BRIEF DESCRIPTION OF THE PREFERRED EMBODIMENTS

Figure 1:
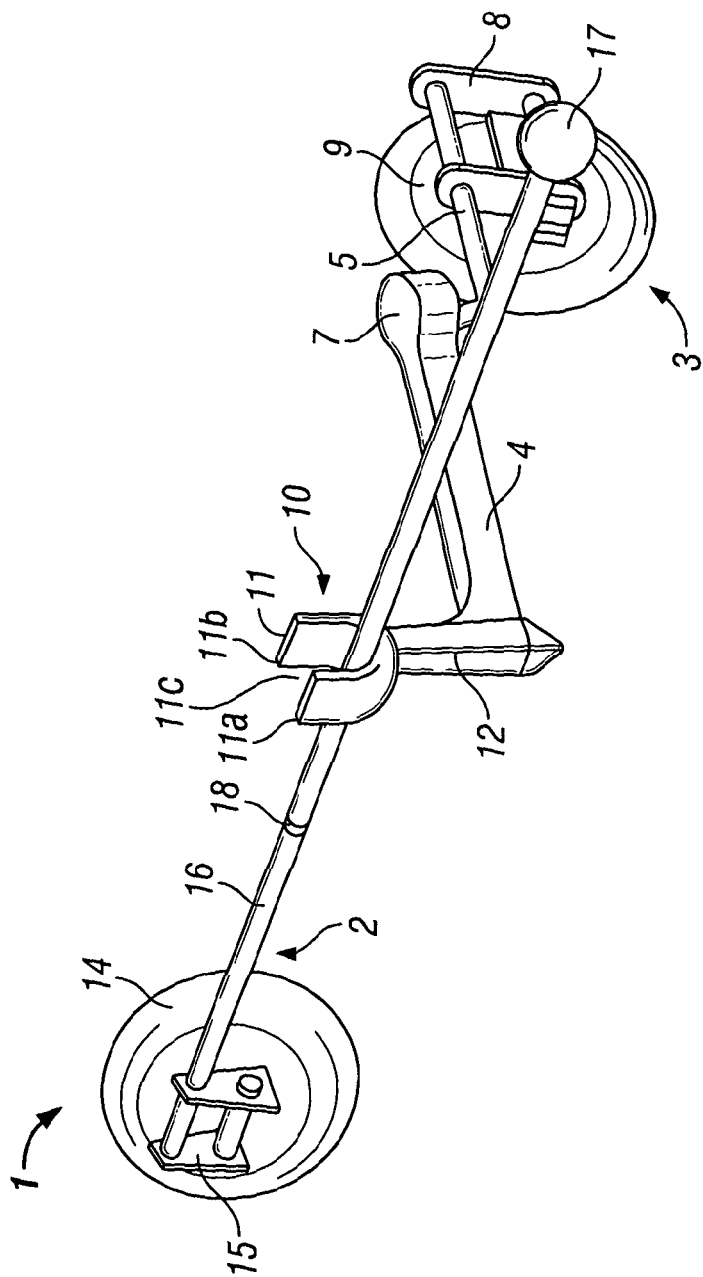
FIG. 1 is a schematic perspective view of exemplary apparatus in accordance with the invention.
Figure 2:
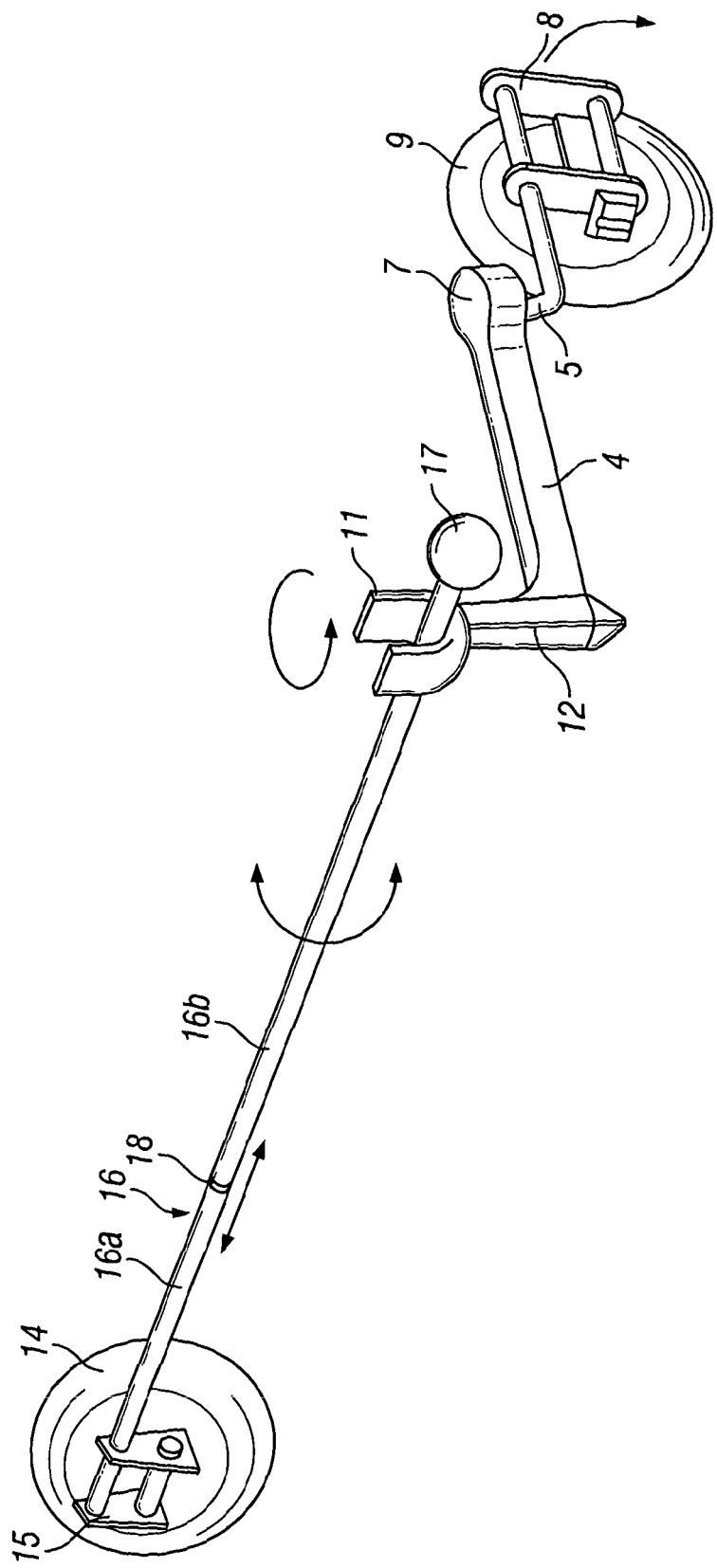
FIG. 2 is a view similar to the view of FIG. 1 showing the apparatus in a limited movement position.

Referring to the drawings, and initially to FIGS. 1 and 2, there is shown windscreen installation apparatus 1 in the form of windscreen anchor assembly 2 cooperating with a side window mount assembly 3 which in the embodiment shown is arranged to be mounted to a side window of a vehicle as in the prior art arrangement disclosed in EP 1923243.

The side window mount assembly 3 is generally similar to the arrangement disclosed in EP 1923243 (Particularly FIG. 11 of that document) and comprises a swing arm 4 rotatably mounted to a connecting arm 5 by means of a pivot hub 7.

The connecting arm 5 has a bracket 8 which connects to a pump actuated sucker device 9 which, when pump actuated, grips onto the side window of the vehicle to mount the mount assembly 3. The bracket 5 is capable of being released from a locking position to pivot downwardly, when required, to finally position the windscreen in the window aperture of the vehicle. This facility is described in the prior art disclosure of EP 1923243.

The mount assembly 3 differs substantially from the arrangement shown in EP 1923243 in that in place of a pivot rod (or pin as disclosed in US7610666) an improved mount structure 11 is provided having a U-shaped mount structure (that could be as described as a yoke, rollock or saddle structure) having opposed upstanding sides 11a, 11b and an open upper portion 11c. The mount structure 11 is rotatably mounted to the spar 12 extending upwardly from the swing arm 4 such that the mounting structure 11 can rotate about an upright or vertical axis defined by spar 12.

The windscreen anchor assembly 2 comprises a pump action vacuum sucker device 14 similar to the device 9 which is mounted by a bracket 15 to an elongate rigid support arm rod 16. The end of the support arm rod 16 distal from the suction device 14 is provided with a spherical stop member 17. The rod is of two-part construction arranged to be connected at a fixing joint 18 partway along the length.

As can be seen from the drawings, the support arm rod 16 can be lowered into the mount structure 11 via the open upper portion 11c to be received between the upstanding walls 11a, 11b. In this position the support arm rod 16 engages with the mounting structure 11 between the opposed ends of the rod 16 such that the rod 16 can slide lengthwise in contact with the base of the U-shaped mount structure 11 whilst remaining supported in the mount structure 11. The support arm rod 16 moves bodily, in its entirety, in the longitudinal direction of the rod (arrow A of FIG. 2) through and past the mount structure 11. The mount structure 11 can also rotate on its rotatable mounting 7 with respect to the spar 12 (arrow B in FIG. 2) and in addition because the rod 16 is of generally circular cross section the rod can also rotate about its own axis seated on the mounting structure 11 (arrow C in FIG. 2). In FIG. 2 the apparatus is shown with the elongate support arm rod 16 extended to its limit position in one direction in which the spherical stop member 17 is approaching contact with the side of the mount structure 11. The spherical stop member 17 therefore prevents the elongate support arm 16 from being slidingly moved out of engagement with the mount structure 11.

The mount structure could include a pulley wheel or roller mounted for rotation and upon which the support arm rests for sliding movement. In most situations however sliding directly on the mounting structure is sufficient.

In use the side window mount assembly 3 is mounted to the side window of the vehicle, and the windscreen anchor assembly 2 is mounted to the windscreen in a similar manner to the arrangement disclosed in the prior art EP 1826044, EP 1923243 and also U.S. Pat. No. 7,610,666.

It is then necessary for a technician undertaking the operation to lower the support arm rod 16 into position in which the support arm rod 16 is received somewhere along its length intermediate the upstanding walls 11a, 11b of the mount structure 11.

The arrangements disclosed in the prior art documents EP 1826044, EP 1923243 and also U.S. Pat. No. 7,610,666 require the technician to position the aperture of the windscreen anchor assembly over the mounting pin on the side window mount. This is difficult to do at a distance when holding the full combined weight of the windscreen and support apparatus. The present invention provides an improvement over the prior art in that targeting of the engagement between the support arm 16, and the mount structure 11 is significantly more straightforward and requires less fine targeting than positioning of the engagement pin and aperture in the prior art.

When positioned, such that the support rod 16 is received in the mount structure 11, manipulation for positioning of the windscreen by the technician is also readily achieved because of the multi-directional movement facilitated by moving bodily the support rod, by sliding relative to the mount structure 11; rotation of the support rod 16 about its own axis; and also the facility for the mount structure 11 to rotate along the vertical axis defined by the upright spar 12. Additionally, the support arm rod 16 can pivot in the vertical plane about the mount structure 11.

In view of the fact that there are no engineered bearings constraining movement of the support arm rod 16 (compared to the engineered support blocks 68 of U.S. Pat. No. 7,610,666) or the telescopic arrangement disclosed in EP 1826044, the device of the present invention can be lighter in weight and also more robust than the prior art devices. For example, if the support arm rod 16 of the windscreen anchor assembly of the present invention were to be damaged by becoming dented, bent to a slight degree, then operation of the device would not be significantly impaired. The apparatus would still work satisfactorily, the support arm rod 16 sliding in a satisfactory manner in the mount structure 11 enabling perfectly satisfactory use to be achieved.

Compare this to the potential for damage to the telescoping rod of EP 1826044 or EP1923243 which could easily result in the inability to continue to use the telescoping device. Similarly, potential damage to the rod upon which the bearings carrying the sucker devices of U.S. Pat. No. 7,610,666 may also result in an arrangement that could easily become inoperable.

Figure 3:
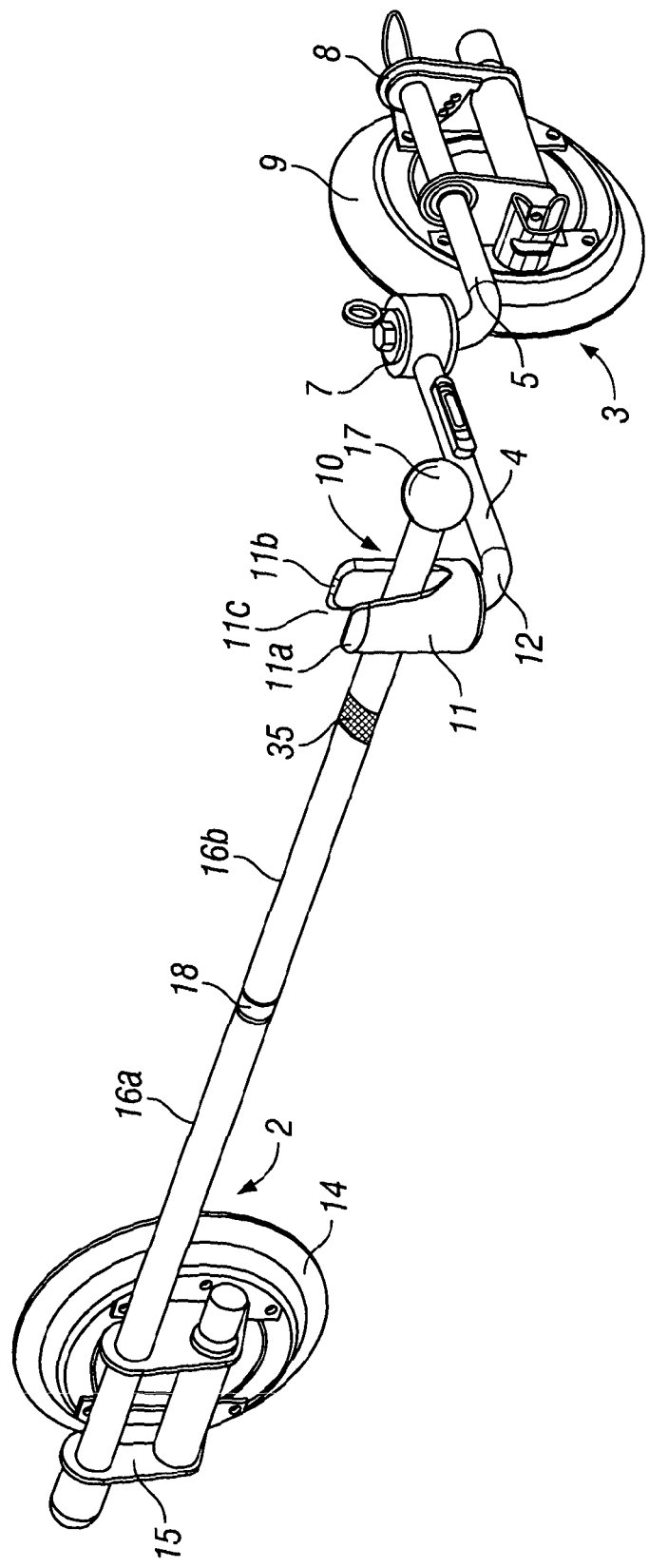
FIG. 3 is a perspective view of a slightly different embodiment of apparatus in accordance with the invention.
Figure 4:
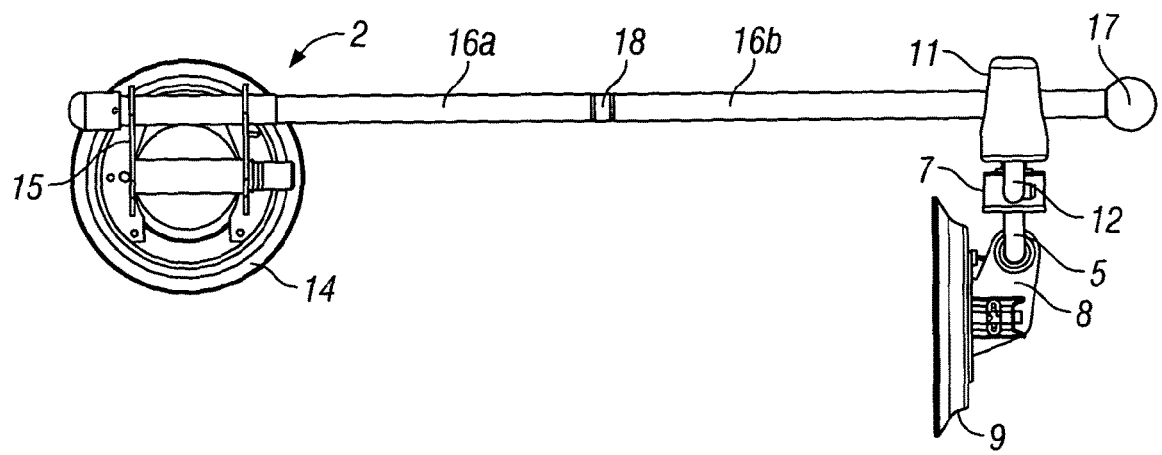
FIGS. 4 and 5 are side and end views of the embodiment of FIG. 3.
Figure 5:
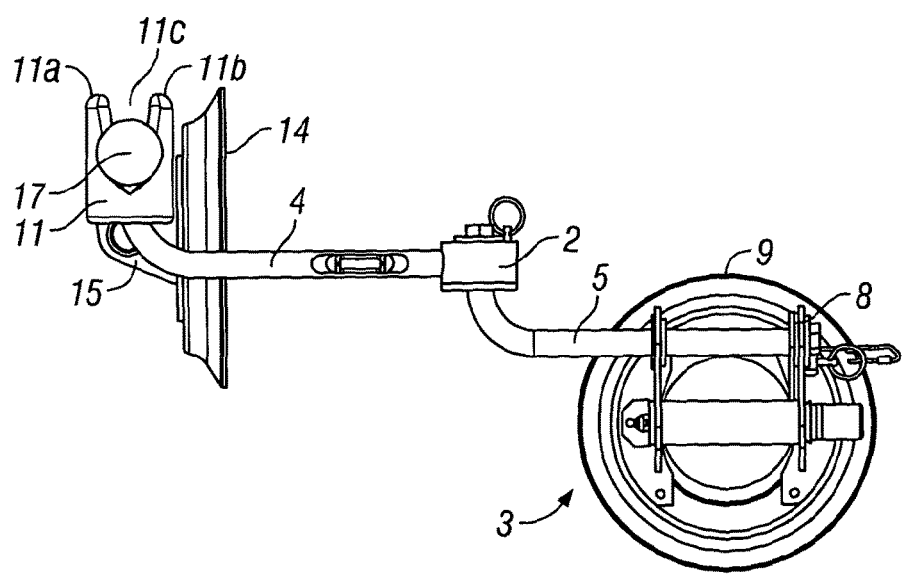
Figure 6:
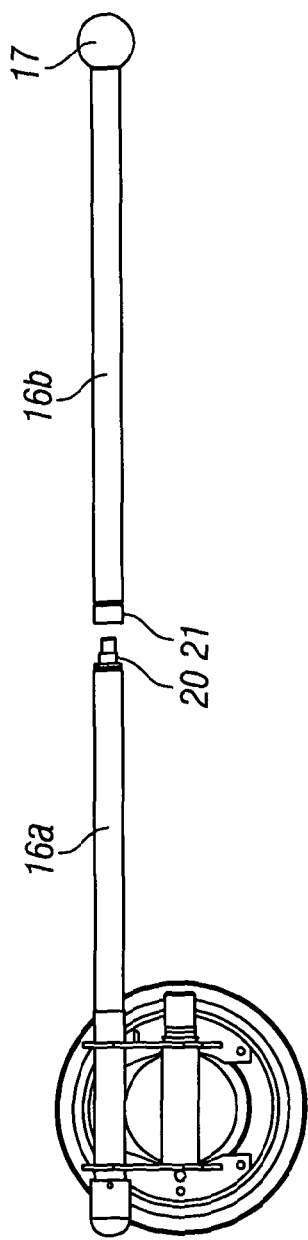
FIG. 6 is a schematic view of the windscreen support assembly with the support arm separated in-two.

As shown most clearly in FIG. 3, the support arm 18 may be provided with a friction or resistance portion 35 which is arranged to slide less easily past the mount structure 11. When the friction portion 35 contacts the mount structure 11 the increased friction means that the swing arm 4 will more readily pivot about pivot arm 107. The friction portion 35 can be used in this way and when the user desires the high friction portion 35 should pass through the mount 11, an additional push or nudge can be given to the rod 16 to move the friction portion past the mount 11.

The high friction portion can be a relatively higher friction material or component secured at the desired position along the length of the rod, or alternatively could, for example, be a knurled portion of the rod. Additionally, or alternatively, a change in rod section or step could provide such a facility, for example, being a waisted section, or a step section in the diameter of the rod. The higher friction or step section is typically provided relatively close to the stop member 17 end of the rod 16.

Figure 7:
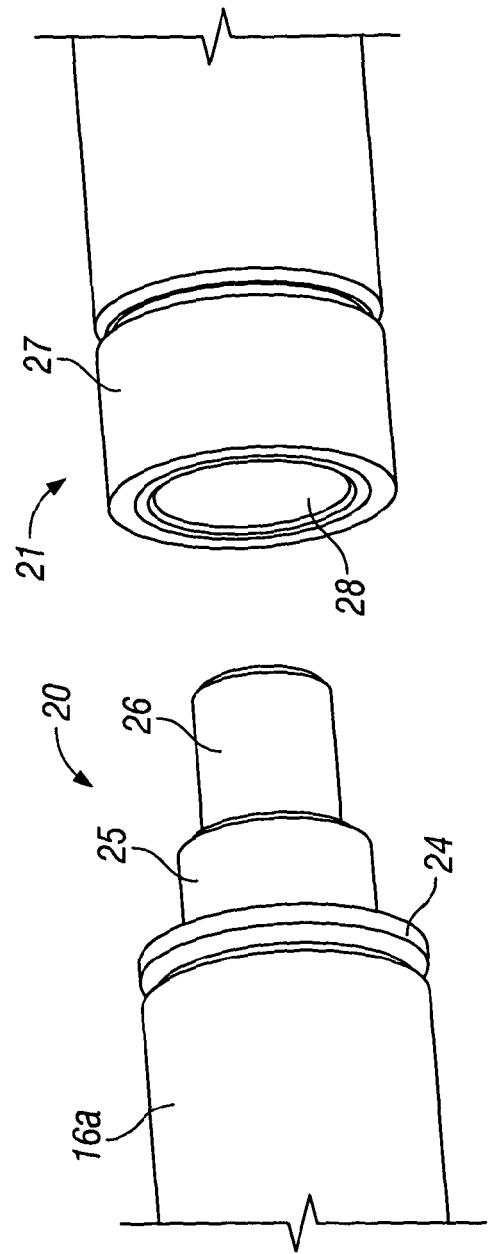
FIG. 7 is a schematic sectional view showing the connection between the two pieces of the support arm of the arrangement of FIG. 5.
Figure 8A:
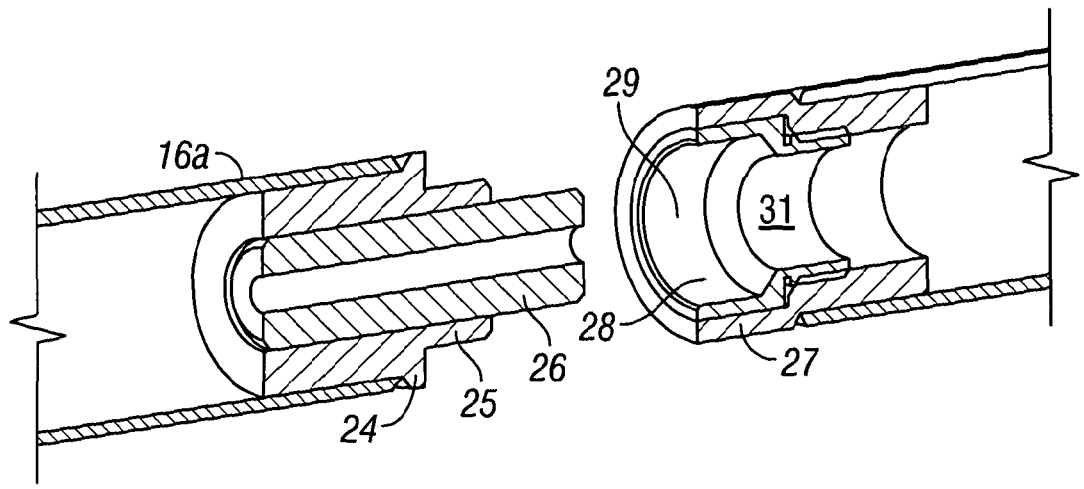
FIGS. 8A and 8B are perspective sectional views showing the connection of FIG. 7.
Figure 8B:
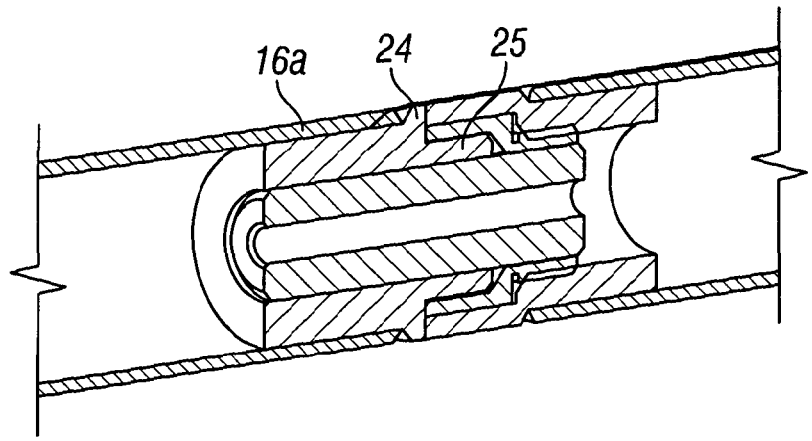

The support arm rod 16 of the present apparatus can be dismantled by the connection joint 18. As shown in FIGS. 7 and 8 a connector portion 20 of the first part of the rod 16a is received within a female connector 21 of a second rod part 16b. The connector portion 20 includes an insert 24 into the interior of rod portion 16a, the insert 24 having a collar 25 receiving an insert 26 which has an external screw thread.

The connector 21 has a female insert 27 which receives a further insert 28 having an internal threaded bore 31 for mating with the threaded insert 26. A bearing portion 29 is provided for close fitting engagement with the collar 25. This provides for rigid connection by screw thread and also that any bending motion is taken up in contact between the collar 25 and the bearing surface 29.

FIGS. 15 and 16 show an alternative arrangement for two parts 416a and 416b of the windscreen anchor rod 416. In this embodiment, the part 416b which is provided with end stop member 417 is also provided with a male connector 420 having an engagement pin 426 extending outwardly from an engagement collar 425. The engagement pin is a component having a pair of spring mounted detents 424 which are capable of being biased from a 'normal' externally projecting position as shown in FIGS. 15 and 16 to a position in which the detents are retracted to lie flush with the outer surface of the anchor rod 416b. A retraction mechanism comprises a retraction rod 492 which extends along the entire length of the anchor rod 416b and through a bar 495 in the end stop member 417 to an actuator end 493 which projects into a recess 494 in the end stop member 417. Pressing the actuator rod end 493 causes the retraction rod 492 to move and actuate a mechanism internally of the pin 426 to retract the detents 424.

The female connector end 421 of the rod part 416a is provided with a collar insert 428 arranged to provide an abutment surface against engagement collar 425 or rod part 16b. the surfaces 425 and 428 are tapered to improve the engagement fit between the two parts. The collar insert 428 has a constriction 427 arranged to permit the engagement pin 426 to extend therethrough, but only if the detents 424 are retracted. When the pin 426 is inserted past the constriction 427 and the detents are allowed to spring back outwardly, the pin is secured and the two parts 416a and 416b are connected.

The arrangement enables the user to connect and disconnect the two rod parts 416a, 416b by pressing the actuator end 493 at the stop member 417 end of the rod in a quick and convenient manner.

Figure 9:
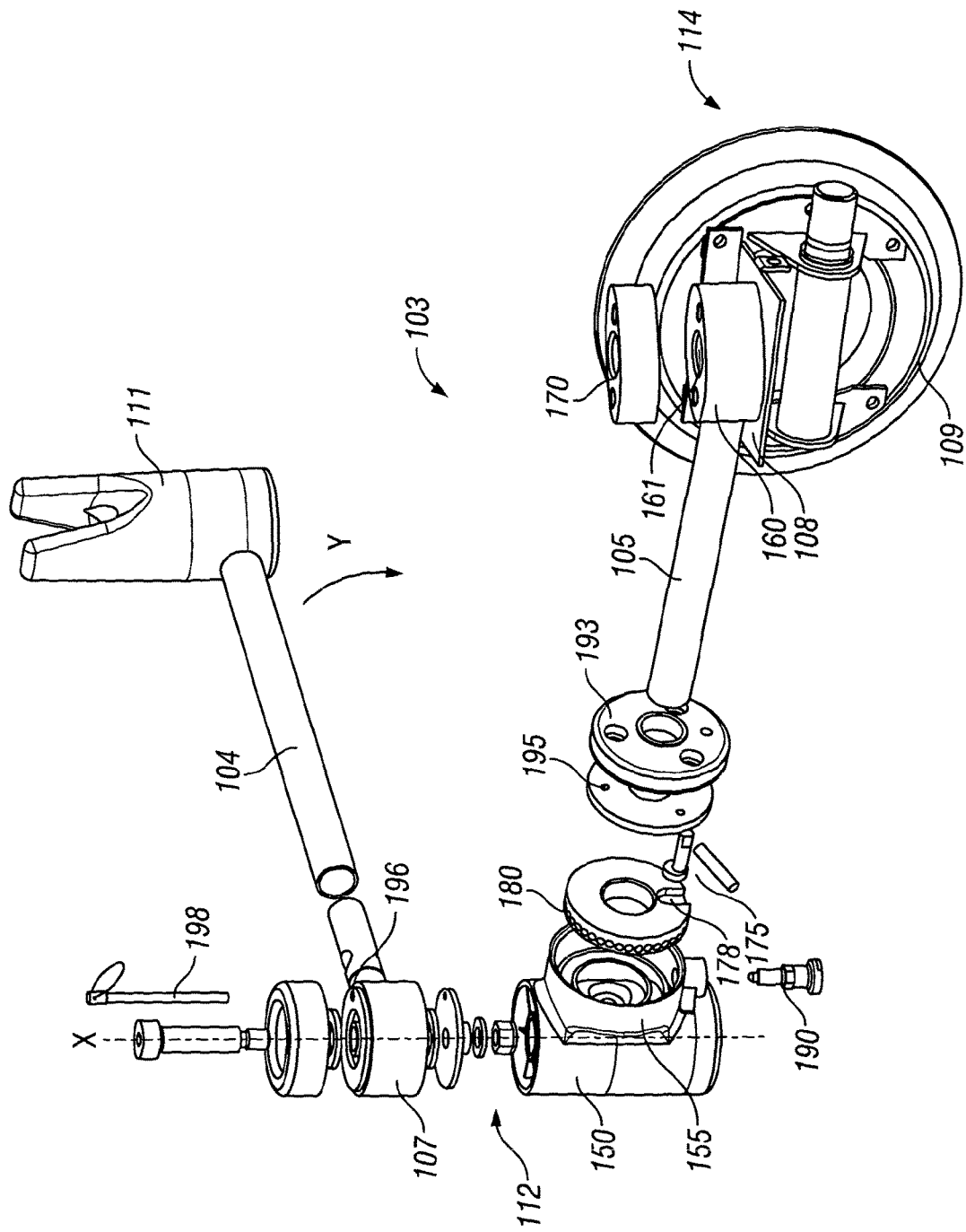
FIG. 9 is a perspective expanded view of an alternative embodiment of anchor device for apparatus in accordance with the invention.

In FIG. 9 an alternative embodiment of side window anchor assembly 103 is shown which can be used to replace the side window anchor assembly 3 of the preceding figures. In this embodiment modifications have been made to provide further advantageous technical enhancements to the device. In particular, in the embodiments shown the connecting arm 105 is mounted to the pump actuated sucker device 109 via a mounting boss 160 which is rotatably mounted to the bracket 108. The bracket 108 may be provided with a mounting spigot (not shown) upon which the central bore 161 of the sucker boss 160 is received. The connecting arm 105 can pivot between two extreme positions (for example 180 degrees apart) to extend either in the direction shown in FIG. 9 away from the sucker device 109, or in the opposite direction. This enables the side window anchor assembly 103 to be set up so as to be mounted either to the passenger side window or the driver side window depending upon the user's preference.

When the arm 105 is pivoted to the required orientation during set up (or prior to set up) the arm 105 can be secured in the required position. This may be achieved by use of a clamping cap 170 to be secured with bolts mounted on top of the sucker boss 160. Alternatively the mounting spigot (not shown) on which the bore 161 sits may have an upper threaded portion which can thread into a portion in the cap enabling the cap to rotationally clamp down on the boss 160 to secure it in the required position. Clearly, various means for securing the sucker boss 160 in position can be envisaged. The important fact is that the arm 105 can be pivoted to extend in either of two opposed directions away from the sucker device 109.

In the arrangement of the preceding figures, the spar 12 is provided with a pivot hub 7 which permits the swing arm 4 to pivot side to side about a vertical axis. Similarly, in the arrangement of FIG. 9 a pivot hub 107 is provided which is rotatable about the vertical axis X enabling the swing arm 104 to correspondingly pivot via its connection to the pivot hub 107 in a side to side fashion. However, in the arrangement of FIG. 9 additionally spar 112 comprises a raising and lowering index hub 150 which is rotatable about the longitudinal axis of the connecting arm 105. This provides for raising and lowering of the mount 111. In order to achieve this, a plate 193 is secured to the connecting arm 105 and a brake disc 195 and index wheel 180 is mounted on the arm 105. The index wheel 180 has a series of peripheral index recesses or apertures to receive the end of an index pin 190. The index wheel rotates within a cylindrical housing 155 formed on the index hub 150. The index wheel 180 and the disc 195 are clamped tightly between the housing 155 and the plate 193. The housing 155 also holds the index pin 190. The index pin 190 is spring loaded and can be pulled out of engagement with the index recesses on the index wheel 180 to permit the index hub to be rotated about the axis of the connecting arm 105. When the desired position is reached the index pin can be released and returns into engagement with the index wheel securing the index hub in the required position, rotationally oriented with respect to the axis of the connecting arm 105. A cam and handle arrangement 175 includes a cam 176 which is received in a slot 178 in the index wheel 180 for fine adjustment of the index wheel to ensure that the index pin can fully engage in the relevant selected index recess in the index wheel 180. This angular adjustment of the index hub 150 with respect to the orientation of the axis of the connecting arm 105 is useful in setting up the device in the appropriate position in the field on the side window of the vehicle.

Furthermore, this feature can be used in order to ease lowering of the edge of the windscreen into position. In this case, with the user holding the rod 16 close to the end stop 17, the index pin 190 can be released and the mounting structure 111 can be rotated downwardly (direction of arrow Y) so as to no longer provide a hindrance to the edge of the glass being lowered into the vehicle windscreen aperture. The prior art achieves this effect in a significantly different way in that the present arrangement provides an advantageous means of achieving this which is effectively designed into the side window anchor assembly. The arrangement of the present invention effectively provides a rotatable or pivotable mounting to enable the mounting structure 111 to be moved between a dropped down and a raised up position.

The pivot hub 107 is provided with a receiving aperture 196 for receiving a securing pin 198 providing that the arm 104 can be fixed to prevent rotation about the vertical axis X should this be required, or preferred, for particular circumstances of operation.

Figure 12:
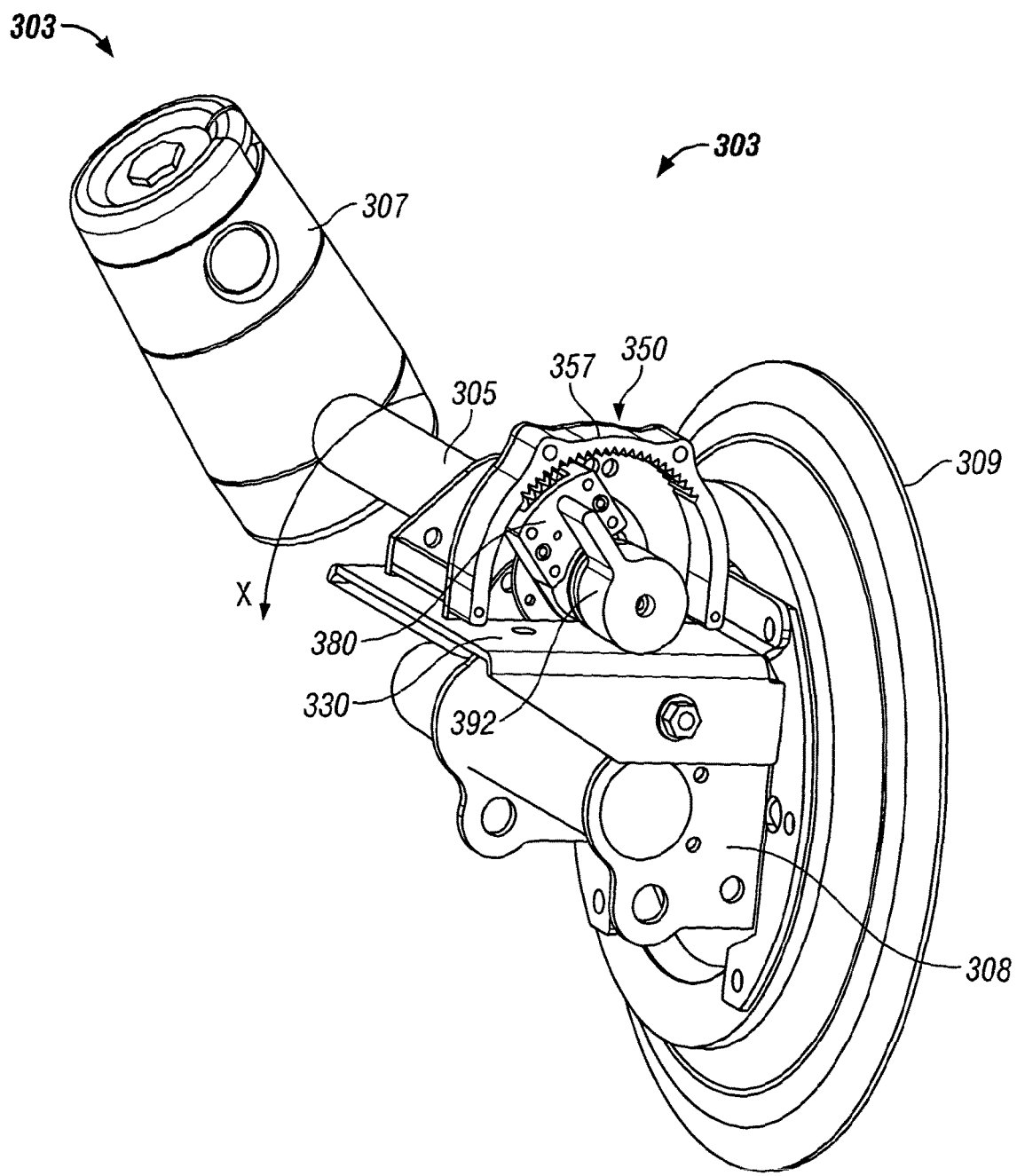
FIG. 12 is a schematic perspective view of an alternative embodiment of anchor device for implementation of the invention.
Figure 13:
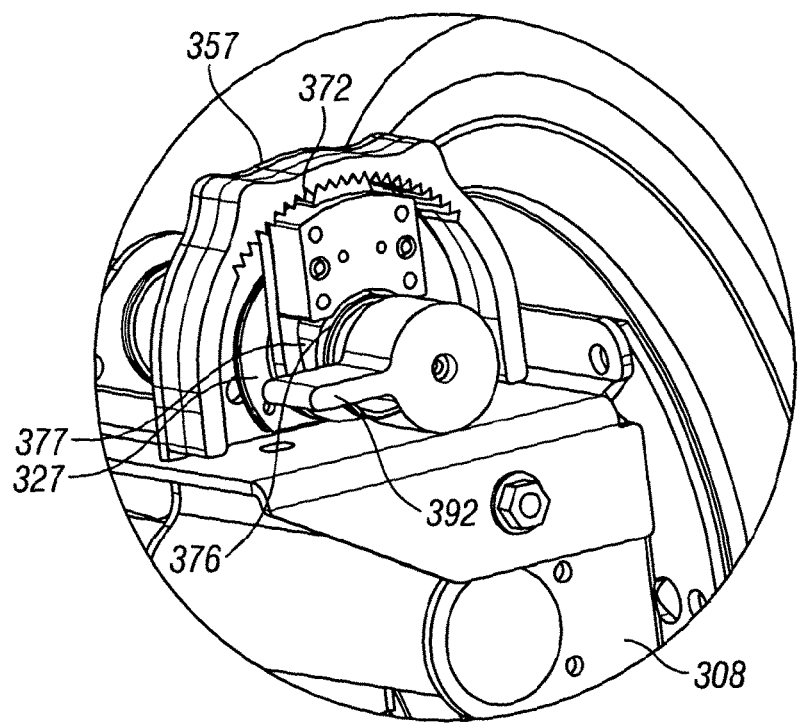
FIGS. 13 and 14 are detailed views of the apparatus of FIG. 12 in alternate configurations.
Figure 14:
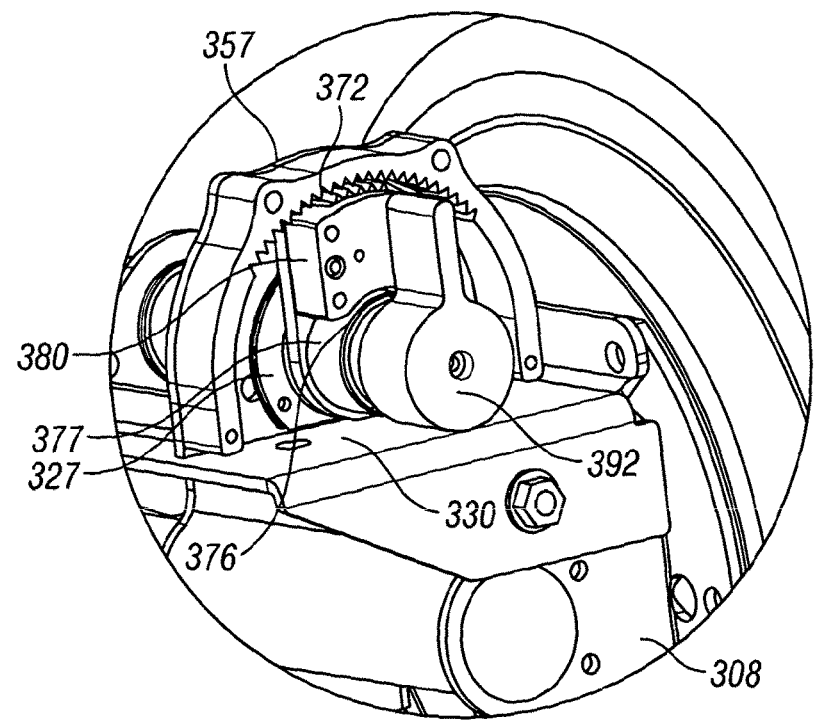

In FIGS. 12 to 14, a further alternative embodiment of side window anchor assembly 303 is shown which can be used in place of the side window anchor assemblies of the previously described embodiments. The side window anchor assembly 303 is generally more similar to the arrangement 103 of FIG. 9 in that it can be adapted for use on passenger or driver side glass (by reversing the direction of connecting arm 305) and a raising and lowering index hub 350 is provided to enable the swing arm pivot hub 307 to pivot about the longitudinal axis of the connecting arm 305 (in the direction of arrow X in FIG. 12).

In this embodiment, the raising and lowering index hub 350 is provided at the sucker device 309 side of the connecting arm 305, being mounted to the sucker bracket 308. The connecting arm 305 is mounted to have an end rotationally mounted in an end bearing 327 secured to a mounting platform 330 by a frame 357. The frame 357 has an internal surface provided with an arcuate geared rail 372, a locking gear 380 and locking cam 376 assembly mounted to the end of the connection arm 305. The locking gear 380 is fixed to rotate with the end of the connecting arm 305, the locking cam 376 is rotatable and connected to an actuation handle 392. The locking cam 376 is provided with a cam recess 377 radially positioned adjacent the cam handle 392. When the cam handle 392 is turned to the horizontal positions (as shown in FIG. 13) the cam recess 377 is not adjacent the locking gear 380 and the locking gear 380 is forced upwardly into engagement with the gear rail 372 by the cam portion of the locking cam 376. The gear teeth of the rail 372 and locking gear 380 are in meshed engagement in this position, and the arm 305 is held against rotation. The locking gear 380 is constrained to move linearly only. When the cam handle 392 is turned to the vertical position (as shown in FIG. 14) the cam recess 377 is adjacent the locking gear 380 and the locking gear drops down into the cam recess 377 (a biasing spring—not shown—is provided for this purpose). With the locking gear 380 in the dropped down position, gear teeth of the rail 372 and locking gear 380 are out of meshed engagement, and the connecting arm 305 can rotate in its mounting bearing 327 (arrow X in FIG. 12) enabling the swing arm pivot hub 307 to provide the drop down facility for the mount 111. As shown in FIG. 15, the locking gear 380 and locking cam both rotate with the connecting arm 305. The locking gear 380 can engage with the fixed gear rail 372 over a range of angular orientations.

This enables the technician to adjust the position for set up on different vehicles. The rotatable bearing 327 may be provided with a damping arrangement to damp the motion of the connecting arm 305. This prevents uncontrolled drop down and the risk of damage to the vehicle.

In the embodiment of FIGS. 13 to 15, the side window anchor assembly can be reversed for use on the opposed side of the vehicle by unfastening the mounting platform 330 and reversing the mounting position through 180 degree and re-securing to the bracket 308. Typically mounting screws or bolts are provided for this purpose.

Figure 10A:
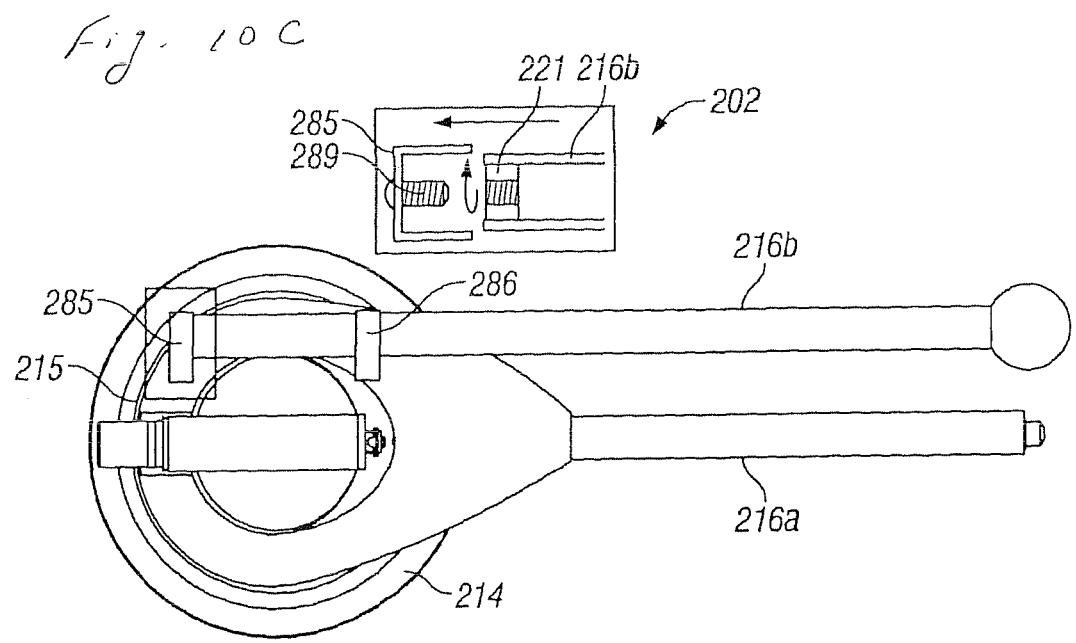
Figure 10B:
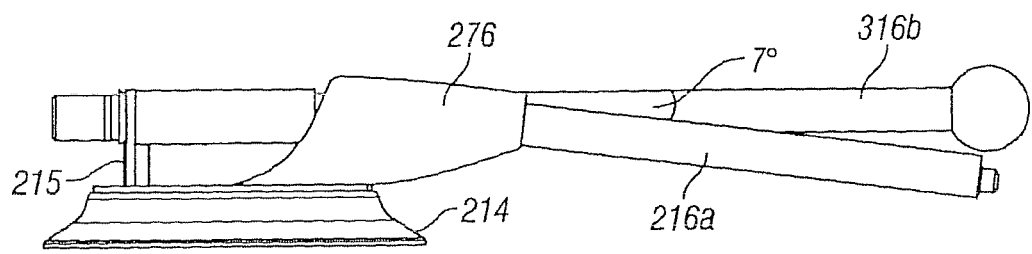

As described earlier, the windscreen support rod 16 is provided in two-part form with a connection joint 18. In the arrangement shown in FIGS. 10a and 10b the windscreen anchor assembly 202 has the ability to dismantle to enable storage with the support rod 116 dismantled into its separate parts 216a and 216b. The fixed, distal end of the rod 216a extends outwardly from the sucker device 214 via a plastic moulding shroud 276. The female connector 221 at the end of the rod part 216b is arrangement to cooperatively releasably engage with a receiving socket 285 mounted to the suction device mounting bracket 215. The receiving socket 285 is provided with a male threaded shaft 289 to screw threadingly mate with the female connector 21 of the second rod part 216b. The end of the rod 216b can first be past via a supporting collar 286 also provided on the mounting bracket 215. In the position shown, the extension rod part 216b is securely mounted to the sucker device 214 extending in side by side relationship to the fixed rod part 216a. For operational purposes the fixed rod part 216a extends outwardly at an inclined angle (of approximately 7 degrees). In the arrangement shown in FIG. 10a the extension rod part 216b is not inclined at that angle, but rather extends horizontally.

The arrangement provides a convenient means for storing the extension rod part 216b in a configuration in which the overall size of the unit is minimised for storage or stowage. The arrangement effectively provides a windscreen anchor assembly comprising a windscreen anchor suction device 214 and an elongate support arm extending away from the windscreen anchor device, the elongate arm being dismantle-able into pieces 216a 216b for stowage, the anchor device 214 and a dismantled arm part 216b being provided with means 221 285 for attaching to one another for stowage.

Figure 11A:
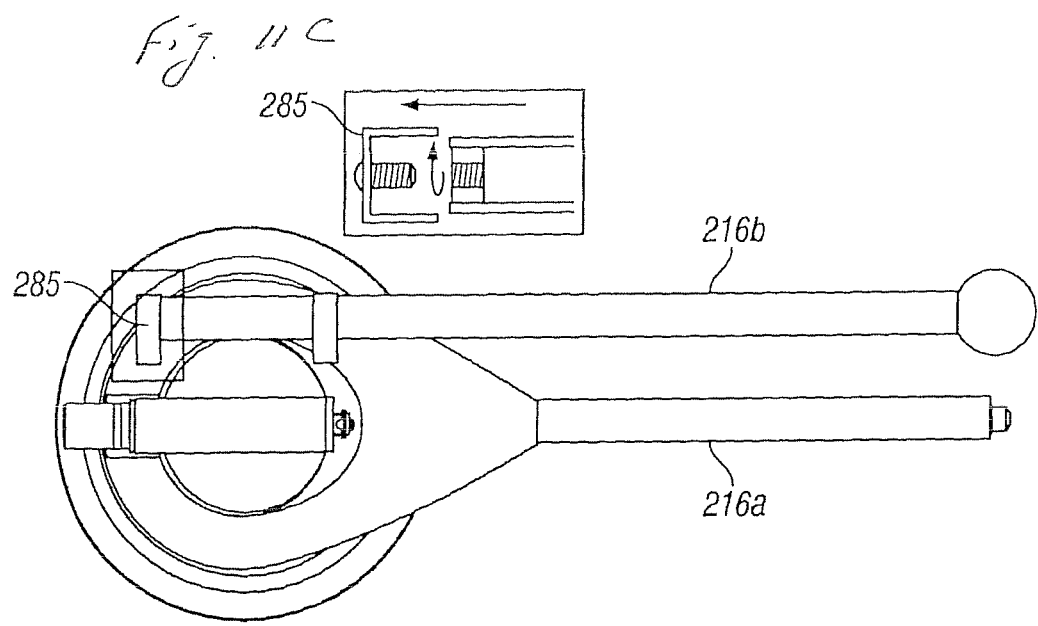
Figure 11B:
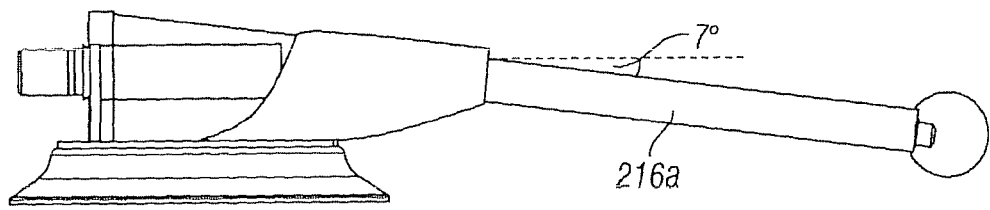

In certain circumstances it is envisaged that means other than a threaded connection between the extension rod part 216b and the fixed rod part 216a may be provided, such as a bayonet fitting or other quick release fitting. In such circumstances the means for receiving the end of the extension rod part 216b on the suction device mounting bracket will correspondingly need to be adapted to provide the required secure connection with the end of the extension rod part 216b. Referring to FIGS. 11a to 11c it has been shown as generally similar to the arrangements shown in FIGS. 10a to 10c. However, in the arrangement shown the extension rod bracket 285 is configured and orientated to receive the extension rod part 216b at the inclined angle corresponding to the angle of inclination of the fixed rod part 216a.

The apparatus has proved convenient to use and robust and also significantly lighter and less expensive to manufacture than the prior art arrangements known.

The apparatus has primarily been described with a side window anchored mount, however it will be appreciated that in its broadest scope alternative mounts could be used such as a floor mounted mount or a vehicle roof mounted mount.

The invention claimed is:

1. An apparatus for use in handling a windscreen for a vehicle in conjunction with a windscreen anchor assembly that includes a windscreen anchor device and an elongate support arm extending away from the windscreen anchor device, the apparatus comprising:
a mount structure having a configuration that engages the support arm of the windscreen anchor assembly; and
a vehicle anchor device having a configuration that secures the vehicle anchor device to the vehicle, wherein the vehicle anchor device is a side glass anchor device comprising a suction device and is configured to secure the mount structure to side glass of the vehicle;
wherein the mount structure includes a yoke or saddle structure having opposed upstanding sides and an open upper portion, the yoke or saddle structure having a support surface that supports the support arm and permits the support arm to slide relative to the mount structure, and wherein the mount structure is configured for rotatable movement relative to the vehicle anchor device.

2. The apparatus according to claim 1, wherein:
the support arm extends outwardly on opposed sides of the mount structure.

3. The apparatus according to claim 1, wherein:
the open upper portion of the yoke or saddle structure is configured to receive the support arm as the support arm is lowered through the open upper portion.

4. The apparatus according to claim 3, wherein:
the open upper portion of the yoke or saddle structure is further configured to permit the support arm to be lifted out of the mount structure.

5. The apparatus according to claim 4, wherein:
the opposed upstanding sides of the yoke or saddle structure are configured to guide sliding movement of the support arm relative to the mount structure.

6. The apparatus according to claim 1, wherein:
the opposed upstanding sides of the yoke or saddle structure are configured to guide sliding movement of the support arm relative to the mount structure.

7. The apparatus according to claim 1, wherein:
the mount structure is further configured to permit the support arm to rotate or pivot about the location of connection of the support arm to the mount structure.

8. The apparatus according to claim 1, wherein:
the support arm is:
i) of circular cross section in the region of interaction with the mount structure; and/or
ii) provided with a friction or resistance surface portion or formation which is arranged to resist sliding on the mount structure.

9. The apparatus according to claim 1, wherein:
the support is a substantially rigid arm of fixed length.

10. The apparatus according to claim 1, wherein:
the windscreen anchor device is mounted in a fixed longitudinal position on the support arm.

11. The apparatus according to claim 1, wherein:
the support arm is in two or more parts arranged to engage end to end.

12. The apparatus according to claim 1, wherein:
the windscreen anchor device comprises a suction device.

13. The apparatus according to claim 1, further comprising:
a huh supported by the vehicle anchor device; and
an arm portion connected at one end to the mount structure and at a second end to the hub;
wherein the hub is configured to permit pivoting movement of the mount structure relative to the hub.

14. The apparatus according to claim 13, further comprising:
a connecting arm portion connected at one end to the hub and at a second end to the vehicle anchor device.

15. The apparatus according to claim 13, wherein the mount structure is configured to pivot about a pivot point offset laterally from the mount structure.

16. The apparatus according to claim 1, wherein:
the support arm has a stop member that is configured to limit sliding movement of the support member relative to the mount structure.

17. The apparatus according to claim 1, wherein the engagement of the support arm and the support surface permits rotation of the support arm about its own axis while remaining supported in the mount structure.

18. The apparatus according to claim 1, wherein the mount structure is configured to rotate about a rotational axis that passes through the support surface of the mount structure.

19. The apparatus according to claim 1, wherein the support arm is free to pivot in a vertical plane about the support surface of the mount structure.

20. The apparatus according to claim 1, wherein the support surface is curved.

21. A system for use in handling a windscreen for a vehicle, the system comprising:
a windscreen anchor assembly that includes a windscreen anchor device and an elongate support arm extending away from the windscreen anchor device; and
a vehicle anchor assembly that includes a vehicle anchor device and a mount structure, wherein the vehicle anchor device is a side glass anchor device comprising a suction device and that is configured to secure the mount structure to side glass of the vehicle,
wherein the mount structure has a configuration that engages the support arm of the windscreen anchor assembly, the mount structure includes a yoke or saddle structure having opposed upstanding sides and an open upper portion, the yoke or saddle structure having opposed upstanding sides and an open upper portion, the yoke or saddle structure having a support surface that supports the support arm and permits the support arm to slide relative to the mount structure, and wherein the mount structure is configured for rotatable movement relative to the vehicle anchor device.

22. The system according to claim 21, wherein the windscreen anchor device has a configuration that secures the windscreen anchor device to the windscreen.

23. The system according to claim 22, wherein the windscreen anchor device comprises a suction device and the vehicle anchor device comprises a suction device.

* * * * *